United States Patent [19]

Sakai et al.

[11] Patent Number: 4,788,820
[45] Date of Patent: Dec. 6, 1988

[54] HYDRAULIC CIRCUIT FOR LARGE CRANE

[75] Inventors: Hiroaki Sakai, Hyogo; Sachio Hidaka, Kakogawa, both of Japan

[73] Assignee: Kabushiki Kaisha Kobe Seiko Sho, Kobe, Japan

[21] Appl. No.: 50,025

[22] Filed: May 15, 1987

[51] Int. Cl.$^4$ .............................................. F16D 31/02
[52] U.S. Cl. ...................................... 60/444; 60/484; 60/486; 212/198
[58] Field of Search ................. 60/486, 484, 443, 444, 60/458, 493, 433; 212/189, 196, 198

[56] References Cited

U.S. PATENT DOCUMENTS

| | | | |
|---|---|---|---|
| 1,943,196 | 1/1934 | Ward | 212/189 X |
| 4,203,290 | 5/1980 | Burckardt | 60/486 X |
| 4,529,094 | 7/1985 | Wadsworth | |
| 4,599,855 | 7/1986 | Seelman | 60/486 X |
| 4,614,275 | 9/1986 | Zenno | 212/198 |
| 4,627,238 | 12/1986 | Mayr et al. | 60/452 |

FOREIGN PATENT DOCUMENTS 3340332 10/1985 Fed. Rep. of Germany .

OTHER PUBLICATIONS

Mobilhydraulik, Load-Sensing-Ventile zur Optimierung Hydraulischer Systeme, Von Dipl-Ing. E. Weschenfelder, dhf 3/87, p. 66.
Load-Sensing in der Mobilhydraulik, Grundlagen, Eigenschaften und Einsatzgrenzen, 1986, pp. 916, 918, 919.

Primary Examiner—Robert E. Garrett
Assistant Examiner—Mark A. Williamson
Attorney, Agent, or Firm—Oblon, Fisher, Spivak, McClelland & Maier

[57] ABSTRACT

A hydraulic circuit for a large crane furnished with a counterweight carriage detachably connectable to the swivel unit of the crane. The hydraulic circuit includes first and second variable displacement pumps for supplying the working fluid to a hydraulic motor for driving the swivel unit and a hydraulic motor for driving the counterweight carriage, respectively, first and second control circuits including valves for controlling the respective discharge rates of the first and second variable displacement pumps, respectively, in accordance with a signal pressure provided by a third control valve for controlling the operation of the swivel unit and the counterweight carriage, a hydraulic circuit for joining the flows of the working fluid discharged from the first and second variable displacement pumps when the swivel unit is operated without the counterweight carriage, and a changeover mechanism for selectively changing the state of the first flow control circuit so that the discharge rate of the first variable displacement pump is regulated properly according to the operating condition of the swivel unit. The discharge rates of the first and second variable displacement pumps are regulated so that the counterweight carriage is driven for movement in perfect synchronism with the swivel motion of the swivel unit.

2 Claims, 3 Drawing Sheets

HYDRAULIC CIRCUIT FOR LARGE CRANE

BACKGROUND OF THE INVENTION

Field of the Invention

The present invention relates to a hydraulic circuit for a large crane having a detachable counterweight carriage and, more particularly, to a hydraulic circuit for such large crane, capable of synchronously controlling both the swivel motion of the crane unit and the traveling motion of the counterweight carriage.

Description of the Prior Art

Conventionally, a large crane is furnished with a counterweight carriage connected to the rear end of the swivel unit of the crane arrangement to enhance the lifting capacity, and the wheels of the counterweight carriage are driven when the swivel unit of the crane arrangement is swiveled so that the counterweight carriage will travel about the center of swivel motion of the swivel unit as the swivel unit is swiveled. Such a conventional large crane has two separate hydraulic circuits, namely, a hydraulic circuit for driving the swivel unit of the crane arrangement for swivel motion and a hydraulic circuit for driving the wheels of the counterweight carriage. Accordingly, it is the fact that the swiveling speed of the swivel unit of the crane arrangement and the traveling speed of the counterweight carriage do not match is liable to occur and one of the swivel unit and the counterweight carriage impede the motion of the other, making accurate crane work impossible and remarkably deteriorating the efficiency of the work of the crane. Furthermore, when the counterweight carriage is disconnected from the crane arrangement and the crane arrangement is operated independently, the working fluid discharged by the oil pump for supplying the working fluid to the hydraulic motor for driving the driving wheels of the counterweight carriage is uselessly circulated and returned to the tank so as to thus waste energy.

SUMMARY OF THE INVENTION

The present invention has been made to solve such problems in the conventional large crane. It is therefore an object of the present invention to provide a hydraulic circuit for a large crane combined with a counterweight carriage, capable of driving the swivel unit of the crane and the counterweight carriage connected to the swivel unit so that the swiveling speed of the swivel unit and the traveling speed of the counterweight carriage match to enable the swivel unit to swivel and the counterweight carriage to travel synchronously with each other for accurate and efficient crane work, and also capable of effectively utilizing the working fluid discharged by the oil pump for supplying the working fluid to the hydraulic motor for driving the driving wheels of the counterweight carriage so as to enhance energy saving effect when the crane is operated without the counterweight carriage.

To achieve the foregoing object of the invention, the present invention provides a hydraulic circuit for a large crane furnished with a counterweight carriage detachably connectable to the rear end of the swivel unit of the crane arrangement thereof, comprising: a first variable displacement pump; a second variable displacement pump; first hydraulic motor for driving the swivel unit of the crane arrangement of the crane for swivel motion; a first control valve for controlling the flow of the working fluid from the first variable displacement pump to the first hydraulic motor; a third control valve for controlling the operation of the first control valve; a first flow control circuit for controlling the discharge rate of the first variable displacement pump according to a signal pressure applied thereto from the third control valve; a second hydraulic motor for driving the driving wheels of the counterweight carriage; a second flow control circuit for controlling the discharge rate of the second variable displacement pump according to a signal pressure applied thereto from the third control valve, a hydraulic circuit for joining the flow of the working fluid discharged from the second variable displacement pump with the flow of the working fluid discharged from the first variable displacement pump when the counterweight carriage is disconnected from the swivel unit; and changeover means provided in the first flow control circuit for selectively changing the state of the first flow control circuit between a state for applying the signal pressure provided by the third control valve to a controller for controlling the discharge rate of the first variable displacement pump and a state for applying a signal pressure produced by reducing the former pressure at a reduction ratio to the controller for controlling the discharge rate of the first variable displacement pump.

When the swivel unit is swiveled with the counterweight carriage connected thereto, the discharge rate of the second variable displacement pump for supplying the working fluid to the second hydraulic motor for driving the driving wheels of the counterweight carriage which travels along a larger radius is increased beyond the discharge rate of the first variable displacement pump for supplying the working fluid to the first hydraulic motor for driving the swivel unit which swivels along a smaller radius so that the respective angular speeds of the counterweight carriage and the swivel unit coincide with each other. When the counterweight carriage is disconnected from the swivel unit and the crane arrangement is operated independently, the working fluid discharged from the second variable displacement pump is joined to the working fluid discharged from the first variable displacement pump to utilize the working fluid discharged from the second variable displacement pump effectively for driving the swivel unit, so that the energy efficiency of the crane is enhanced, the swiveling speed of the swivel unit is increased and the efficiency of the swivel motion of the swivel unit is improved.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENT

Figure 4:
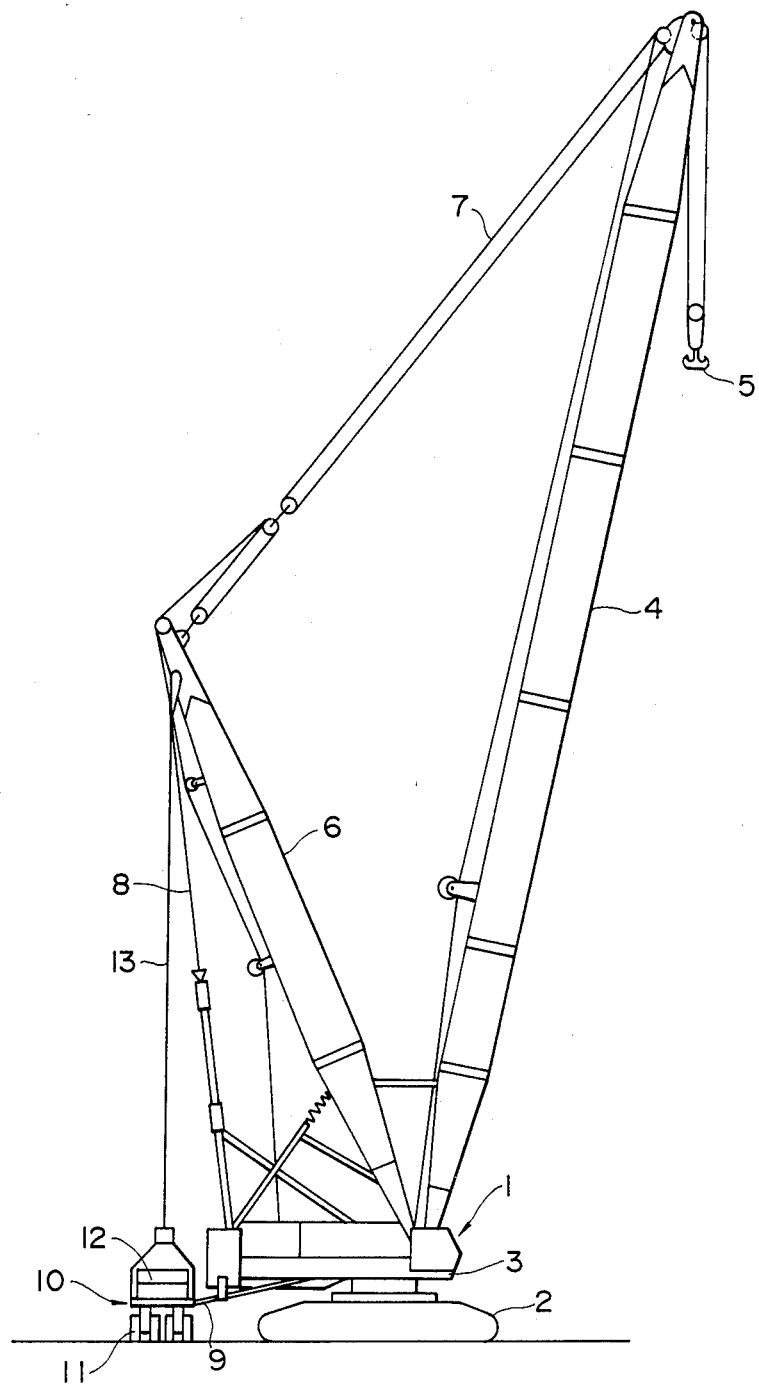
FIG. 4 is a general side elevation of an exemplary large crane incorporating the hydraulic circuit of the present invention.

First, the general constitution of a large crane will be described with reference to FIG. 4. The crane arrangement 1 of a crane comprises a traveling unit 2, a swivel unit 3, a main jib 4, a hanging gadget 5, a mast 6, a guy line 7 for guying the main jib 4, and a guy line 8 for guying the mast 6. A counterweight carriage 10 is provided with a plurality of wheels 11 and is mounted with a counterweight 12. The wheels 11 are each turnable about a vertical axis and rotatable about a horizontal axis. The counterweight carriage 10 is detachably connected to the rear portion of the swivel unit 3 of the crane arrangement 1 by means of a coupling member 9 such as a coupling beam and is also connected detachably to a guy line 13 suspended from the upper end of the mast 6.

Figure 1:
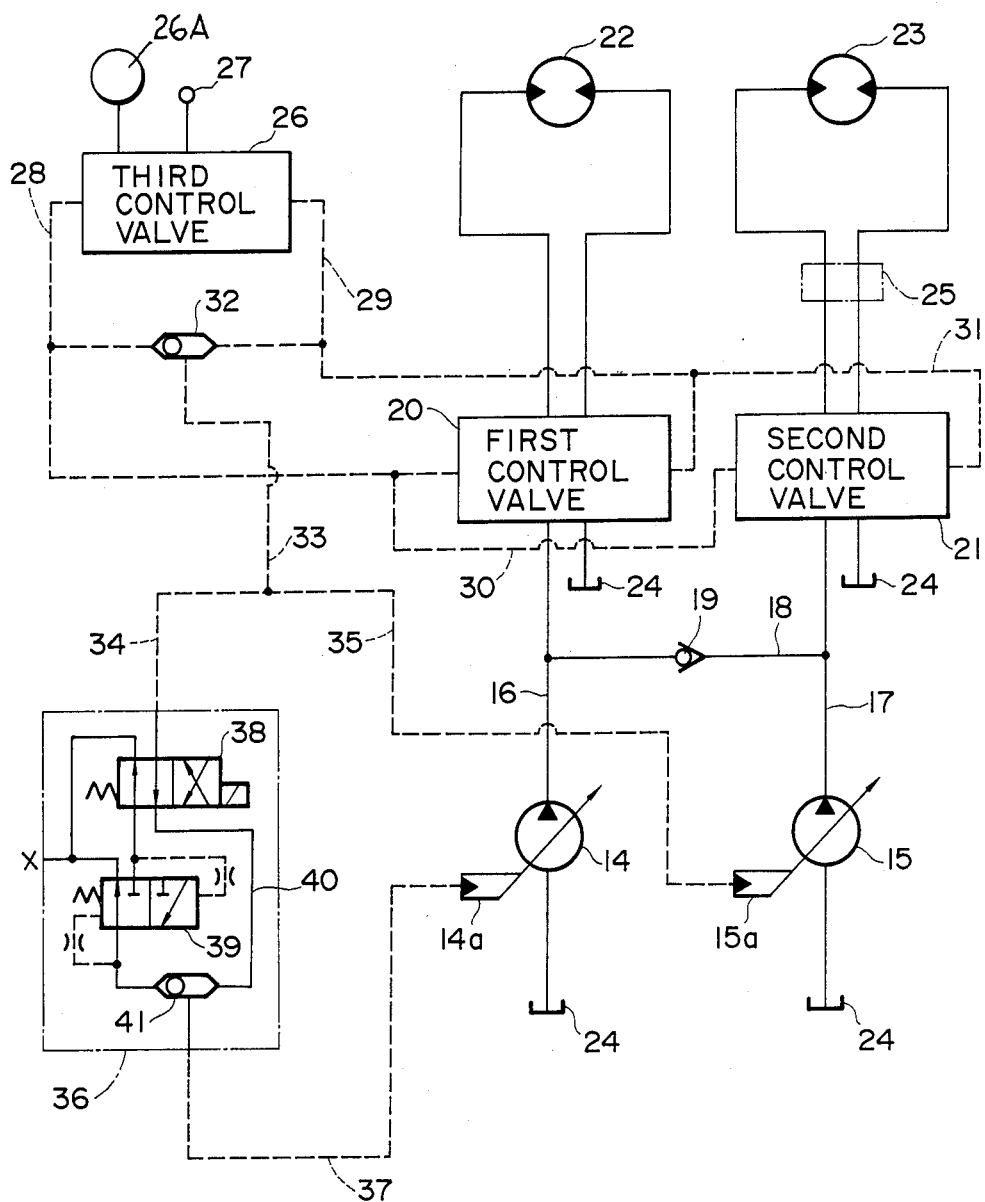
FIG. 1 is a hydraulic circuit, in a preferred embodiment, according to the present invention.

Referring to FIG. 1 showing a hydraulic circuit for controlling the principal components of the large cane, shown therein are a first variable displacement pump 14, a second variable displacement pump 15, a first discharge line 16 connected to the discharge port of the first variable displacement pump 14, a second discharge line 17 connected to the discharge port of the second variable displacement pump 15, a joining line 18 interconnecting the first discharge line 16 and the second discharge line 17, a check valve 19 which permits the flow of the working fluid from the second discharge line 17 to the first discharge line 16 and which checks the reverse flow of the working fluid, a first control valve 20 for controlling the swivel motion of the swivel unit 3, a second control valve 21 for controlling the trowel of the counterweight carriage 10, a first hydraulic motor 22 for driving the swivel unit 3 for swivel motion, a second hydraulic motor 23 for driving the wheels 11 of the counterweight carriage 10, connected to the second control valve 21 through a detachable tube coupling 25 or the like, a tank 24, and a third control valve 26 for operating the swivel unit 3 and counterweight carriage 10 for swivel motion.

The third control valve 26 includes a controllable pressure reducing valve which is operated by means of a control lever 27 and which applies signal pressures each corresponding to the direction and angle of operation of the control lever 27 on the signal lines 28 and 29. A pressure source 26A is connected thereto. The first control valve 20 and the second control valve 21 may be spool type directional control valves, however, the first control valve 20 and the second control valve 21, ordinarily, are pressure control valves such as, for example, four-check valves, capable of changing the direction of flow of the working fluid and controlling the pressure of the working fluid to be supplied to the hydraulic motors 22 and 23. The control position of the second control valve 21 is dependent on the swivel motion signal pressure applied on signal lines 30 and 31.

On the other hand, a line 33 is connected through a high pressure selector valve 32 to the signal lines 28 and 29. A first flow control line 34 and a second flow control line 35 are branched from the line 33. The second flow control line 35 is connected to a flow regulator 15a for controlling the second variable displacement pump 15. A line 37 has one end connected through a changeover valve unit 36 (changeover means) to the first flow control line 34 and the other end connected to a flow regulator 14a for the first variable displacement pump 14. The changeover valve unit 36 comprises a solenoid valve 38, a proportional pressure reducing valve 39, a line 40 and a high pressure selector valve 41. The solenoid valve 38 is capable of changing the position between a left position for connecting the first flow control line 34 to the line 40 and a right position for connecting the first flow control line 34 to the proportional pressure reducing valve 39. The high pressure selector valve 41 connects either the line 40 or the proportional pressure reducing valve 39 to the line 37 depending on the pressure of the working fluid working in the line 40 and the pressure of the working fluid regulated by the proportional pressure reducing valve 39.

The manner of operation of the hydraulic circuit will be described hereinafter. To swivel the swivel unit 3 with the counterweight carriage 10 connected thereto, the wheels 11 of the counterweight carriage 10 are directed in a traveling direction by means of steering means (not shown), then the solenoid valve 38 is shifted to the right position, and then the control lever 27 is shifted, for example, to a left position. Consequently, the third control valve 26 applies a signal pressure $Pi_1$ to the left signal line 28 to change over the first control valve 20 so that the working fluid discharged from the first variable displacement pump 14 is supplied to the first hydraulic motor 22 to drive the first hydraulic motor 22 for rotation in the normal direction, whereby the swivel unit 3 of the crane arrangement 1 is swiveled, for example, in a counterclockwise direction. The signal pressure $Pi_1$ is also applied to the signal line 30 to change over the second control valve 21 so that the working fluid discharged from the second variable displacement pump 15 is supplied to the second hydraulic motor 23 to drive the second hydraulic motor 23 for rotation in the normal direction, whereby the wheels 11 of the counterweight carriage 10 are driven to make the counterweight carriage 10 travel in synchronism with the swivel motion of the swivel unit 3. While the swivel unit 3 is swiveling with the counterweight carriage connected thereto, the position of the control lever is regulated, and thereby the signal pressure $Pi_1$ is regulated accordingly. The respective valve positions of the first control valve 20 and the second control valve 21 are regulated according to the signal pressure $Pi_1$ to control the pressure of the working fluid supplied to the first hydraulic motor 22 and the second hydraulic motor 23 accordingly.

Figure 3:
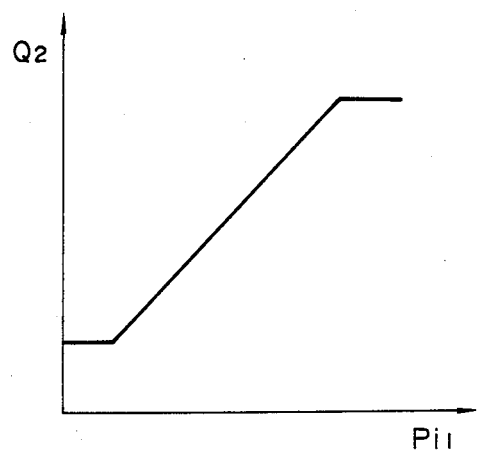

The signal pressure $Pi_1$ is further applied through the high pressure selector valve 32 and lines 33 and 35 to the flow regulator 15a of the second variable displacement pump 15 to control the discharge rate $Q_2$ of the second variable displacement pump 15 so as to follow a curve shown in FIG. 3, whereby the flow rate of the working fluid being supplied to the second hydraulic motor 23 is controlled so as to control the traveling speed of the counterweight carriage 10.

Figure 2:
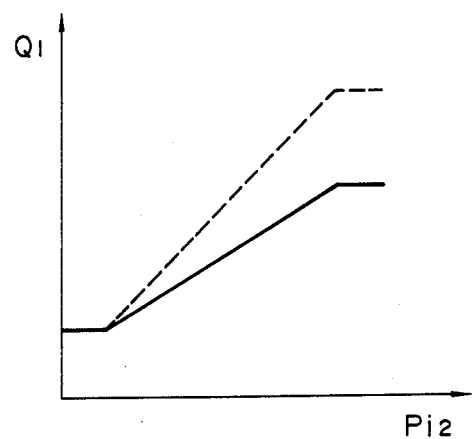
FIGS. 2 and 3 are graphs showing the discharge rate control characteristics of first and second variable capacity pumps, respectively.

On the other hand, the signal pressure $Pi_1$ is also applied through the signal line 28, the high pressure selector valve 32, line 33, line 34 and the solenoid valve 38 of the changeover valve unit 36 to the proportional pressure reducing valve 39 of the changeover valve unit 36. The proportional pressure reducing valve 39 reduces the signal pressure $Pi_1$ to a signal pressure $Pi_2$. Then the signal pressure $Pi_2$ is applied through the high pressure selector valve 41 and the line 37 to the flow regulator 14a of the first variable displacement pump 14 to control the discharge rate $Q_1$ of the first variable displacement pump 14 so as to follow a curve shown in FIG. 2, whereby the flow rate of the working fluid being supplied to the first hydraulic motor 22 is controlled accordingly so as to control the swiveling speed of the swivel unit 3.

Thus, the signal pressure $Pi_1$ is applied to the flow regulator 15a of the second variable displacement pump 15, while the signal pressure $Pi_2$ produced by reducing the signal pressure $Pi_1$ by the proportional pressure reducing valve 39 is applied to the flow regulator 14a of the first variable displacement pump 14. The signal pressure reduction ratio is dependent on the ratio of the discharge rate $Q_2$ necessary for driving the second hydraulic motor 23 for driving the counterweight carriage 10 to the discharge rate $Q_1$ necessary for driving the first hydraulic motor 22 for driving the swivel unit 3. The signal pressure reduction ratio can be easily determined by varying the area ratio of the proportional pressure reduction valve 39. The swiveling speed of the swivel unit 3 and the traveling speed of the counterweight carriage 10 are made to match perfectly by properly determining the signal pressure reducing ratio, so that the swivel unit 3 swivels smoothly together with the counterweight carriage.

To operate the swivel unit 3 without the counterweight carriage 10, the counterweight carriage 10 is disconnected from the crane arrangement 1, the line connecting the second hydraulic motor 23 to the hydraulic circuit are disconnected at the detachable tube coupling 25 from the hydraulic circuit, and the solenoid of the solenoid valve 38 is de-energized to assume in the same position shown in FIG. 1. Then, the control lever 27 is shifted, for example, to the left. Then, as described before, the third control valve 26 provides the signal pressure $Pi_1$, which is applied through the signal line 28 to the first control valve 20 to change the position of the first control valve 20.

On the other hand, the signal pressure $Pi_1$ is applied through the high pressure selector valve 32, the line 33, first flow control line 34, the solenoid valve 38, the line 40, the high pressure selector valve 41 and the line 37 to the flow regulator 14a of the first variable displacement pump 14, and is also applied through the second flow control line 35 to the flow regulator 15a of the second variable displacement pump 15. Since the signal pressure $Pi_1$ is applied through the line 40 to the line 37 bypassing the proportional pressure reducing valve 39, the signal pressure $Pi_2$ applied to the flow regulator 14a is equal to the signal pressure $Pi_1$. The discharge rate $Q_1$ of the first variable displacement pump 14 is controlled in accordance with the signal pressure $Pi_2$ so as to follow the curve indicated by the broken line in FIG. 2. As is obvious from FIG. 2, the discharge rate $Q_1$ in this state is greater than that in the state where the counterweight carriage 10 is connected to the crane arrangement 1. The working fluid thus discharged from the first variable displacement pump 14 is supplied through the first control valve 20 to the first hydraulic motor 22.

The signal pressure $Pi_1$ is applied further through the second control line 35 to the flow regulator 15a of the second variable displacement pump 15 to control the discharge rate $Q_2$ of the second variable displacement pump 15 so as to follow the curve shown in FIG. 3. Since the flow of the working fluid discharged from the second variable displacement pump 15 is blocked by the detachable tube coupling 25, the working fluid flows through the joining line 18 and the check valve 19 and joins with the working fluid discharged from the first variable displacement pump 14. Then, the flow of the working fluid discharged from the first variable displacement pump 14 and the working fluid discharged from the second variable displacement pump 15 flows through the first control valve 20 into the first hydraulic motor 22.

Thus, when the swivel unit 3 is swiveled without the counterweight carriage 10, the working fluid is supplied to the first hydraulic motor 22 from both the first variable displacement pump 14 and the second variable displacement pump 15, so that the working fluid discharged from the second variable displacement pump 15 is used effectively to enhance the energy-saving effect of the hydraulic circuit, the working fluid is supplied to the first hydraulic motor 22 at a high rate and thereby the swiveling speed of the swivel unit 3 is increased to improve the efficiency of the swiveling motion of the swivel unit 3.

In accordance with the present invention, there has been disclosed an effective hydraulic circuit which, when the swivel unit is operated with the counterweight carriage, increases the discharge rate of the second variable displacement pump for supplying the working fluid to the second hydraulic motor for driving the counterweight carriage which travels on a radius greater than that on which the swivel unit swivels over the discharge rate of the first variable capacity pump for supplying the working fluid to the first hydraulic motor for driving the swivel unit, to match the angular speed of the counterweight carriage and that of the swivel unit so that the counterweight carriage travels in synchronism with the swivel motion of the swivel unit so that the swivel unit swivels smoothly to improve the accuracy of the swivel motion. When the swivel unit is operated without the counterweight carriage, the hydraulic circuit joins the working fluid discharged from the second variable displacement pump with the working fluid discharged from the first variable displacement pump to supply both the working fluids to the first hydraulic motor to utilize the working fluid discharged from the second variable displacement pump effectively, so that the energy-saving effect of the hydraulic circuit is enhanced, the swiveling speed of the swivel unit is increased and the efficiency of the swivel motion of the swivel unit is improved remarkably.

Although the invention has been described in its preferred form with a certain degree of particularity, it is understood to those skilled in the art that many changes and variations are possible in the invention without departing from the scope and spirit thereof.

What is claimed as new and desired to be secured by letters patent of the United States is:

1. A hydraulic circuit for a large crane having a counterweight carriage including driving wheels and detachably connectable to the rear end of a swivel unit of the crane thereof, comprising:
    a first variable displacement pump;
    a second variable displacement pump;
    a first hydraulic motor for driving said swivel unit of the crane for swivel motion;
    a first control valve for controlling the flow of working fluid from said first variable displacement pump to said first hydraulic motor;
    a second control valve for controlling operation of said first control valve and for applying a signal pressure;
    a first flow control circuit for controlling a discharge rate of said first variable displacement pump according to said signal pressure applied thereto from said second control valve;

a second hydraulic motor for driving said driving wheels of the counterweight carriage;

a second flow control circuit for controlling a discharge rate of said second variable displacement pump according to said signal pressure from said second control valve;

a hydraulic circuit for joining the flow of the working fluid discharged from said second variable displacement pump with the flow of working fluid discharged from said first variable displacement pump when the counterweight carriage is disconnected from the swivel unit;

a controller for controlling the discharge rate of said first variable displacement pump; and changeover means provided in said first flow control circuit for selectively changing the state of said first flow control circuit between a state for applying the signal pressure provided by said second control valve to said controller for controlling the discharge rate of said first variable displacement pump and a state for applying a second signal pressure produced by reducing the former signal pressure at a reduction ratio to the said controller for controlling the discharge rate of said first variable displacement pump.

2. A hydraulic circuit as recited in claim 1, wherein said changeover means comprises a proportional pressure reducing valve, the pressure reduction ratio of which being dependent on a ratio of the discharge rate of said first variable displacement pump necessary to drive the swivel unit for swivel motion at a required swiveling speed to the discharge rate of said second variable displacement pump necessary to drive the counterweight carriage for traveling in synchronism with the swivel motion of the swivel unit.

* * * * *